(12) United States Patent
Nguyen et al.

(10) Patent No.: US 11,794,535 B2
(45) Date of Patent: Oct. 24, 2023

(54) VEHICLE TRAILER SWAY CONTROL METHOD AND SYSTEM

(71) Applicant: GM GLOBAL TECHNOLOGY OPERATIONS LLC, Detroit, MI (US)

(72) Inventors: Michael Nguyen, Stoney Creek (CA); Norman J. Weigert, Whitby (CA); Ralph D. Schlottke, Whitby (CA); Halit Zengin, Courtice (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 463 days.

(21) Appl. No.: 17/220,359

(22) Filed: Apr. 1, 2021

(65) Prior Publication Data
US 2022/0314718 A1 Oct. 6, 2022

(51) Int. Cl.
*B60D 1/32* (2006.01)
*B60D 1/62* (2006.01)

(52) U.S. Cl.
CPC .............. *B60D 1/325* (2013.01); *B60D 1/62* (2013.01)

(58) Field of Classification Search
CPC .......... B60D 1/325; B60D 1/62; B60T 8/248; B60T 13/741; B60T 13/746
See application file for complete search history.

(56) References Cited

U.S. PATENT DOCUMENTS

| | | | |
|---|---|---|---|
| 2015/0165850 A1* | 6/2015 | Chiu | B60D 1/30 701/1 |
| 2015/0275991 A1* | 10/2015 | De Leon | B60T 13/08 188/162 |
| 2019/0375454 A1* | 12/2019 | Kasaiezadeh Mahabadi | B62D 13/00 |
| 2020/0391711 A1* | 12/2020 | Nitta | B60T 7/20 |

* cited by examiner

*Primary Examiner* — Scott A Reinbold
(74) *Attorney, Agent, or Firm* — Vivacqua Crane PLLC (57) ABSTRACT

A method for dampening trailer sway, includes: receiving, by a controller of a vehicle system that is coupled to a trailer, a vehicle speed signal of the vehicle system, wherein the vehicle speed signal is indicative of a vehicle speed of the vehicle system; determining a friction force to be applied to the trailer by an actuator using the vehicle speed of the vehicle system and a graph that establishes a relationship between the friction force to be applied to the trailer and the vehicle speed; and adjusting, by the controller, the graph that establishes the relationship between the friction force and the vehicle speed using the decay rate of the plurality of oscillation amplitudes to create an updated graph.

20 Claims, 4 Drawing Sheets

VEHICLE TRAILER SWAY CONTROL METHOD AND SYSTEM

INTRODUCTION

The present disclosure generally relates to vehicle trailers and, more particular, to a vehicle trailer sway control method and system.

Trailer customers are told to apply maximum friction on sway control bar units. Not only is this process prone to user error, but it hinders trailer maneuverability at low speed travel. Users are subjected to exiting the vehicle in order to adjust a friction setting every time a driving scenario changes. Due to these reasons, it is desirable to develop a system that dampens trailer sway in a manner that does not require vehicle operators to exit their vehicle.

SUMMARY

The presently disclosed vehicle trailer sway control method and system allows automatic variable friction adjustment to the trailer to enable the vehicle operator to maintain a stiff hitch connection during high speed travel and maximum vehicle maneuverability during low speed travel. This is achieved through a control system that correlates vehicle speed and normal force actuation on the sway control device.

Should trailer sway occur, the system attempts to dampen the oscillations as quickly as possible and recalibrates the friction control algorithm to prevent future swaying. The way this is achieved is by applying high levels of friction when swaying is detected. The resulting oscillations are monitored and characterized in order to determine how much friction is required when the vehicle re-approaches critical speeds. Due to the nature of the control system, it is robust against changes in trailer configuration, weight redistribution, weather/humidity, temperature, road conditions, etc. The presently disclosed vehicle trailer sway control method and system does not impede truck bed space, it does not require trailer brakes and is cost effective.

In an aspect of the present disclosure, a method for dampening trailer sway includes: receiving, by a controller of a vehicle system that is coupled to a trailer, a vehicle speed signal of the vehicle system, wherein the vehicle speed signal is indicative of a vehicle speed of the vehicle system; determining a friction force to be applied to the trailer by an actuator using the vehicle speed of the vehicle system and a graph that establishes a relationship between the friction force to be applied to the trailer and the vehicle speed; commanding, by the controller, the actuator to apply the friction force to the trailer that was determined using the vehicle speed and the graph; receiving, by the controller, hitch angle signal from a hitch angle sensor that is in communication with the controller, wherein the hitch angle sensor is configured to measure and monitor a hitch angle of the trailer that is connected to the vehicle system. The hitch angle sensor may directly or indirectly measure the hitch angle. For instance, the hitch angle sensor may be a displacement sensor capable of indirectly measuring the hitch angle. The displacement sensor provides measurements correlated to the hitch angle. The method further includes detecting, by the controller, the trailer sway using the hitch angle data, wherein the trailer sway occurs has oscillations having a plurality of oscillation amplitudes; in response to detecting the trailer sway; commanding, by the controller, the actuator to apply an adjusted predetermined, variable amounts of frictional force to the trailer to dampen the trailer sway; monitoring a decay rate of the plurality of oscillation amplitudes after commanding the actuator to apply the predetermined, variable amount of frictional force to the trailer; and adjusting, by the controller, the graph that establishes the relationship between the friction force and the vehicle speed using the decay rate of the plurality of oscillation amplitudes to create an updated graph.

In an aspect of the present disclosure, the method may further include determining the friction force to be applied to the trailer by the actuator using the vehicle speed of the vehicle system and the updated graph, and commanding, by the controller, the actuator to apply the friction force that was determined using the vehicle speed and the updated graph.

The relationship between the friction force and the vehicle speed may be a linear function. In an aspect of the presently disclosed method, adjusting, by the controller, the graph includes changing a slope of the linear function.

The relationship between the friction force and the vehicle speed may be a step function, and adjusting, by the controller, the graph includes changing a scale of the step function.

In an aspect of the present disclosure, the method may further include: determining that the decay rate of the plurality of oscillation amplitudes is linear after applying the predetermined, variable amounts of frictional force to the trailer; in response to determining that the decay rate of the plurality of oscillation amplitudes is linear, determining that the trailer is under control; and communicating to an operator of the vehicle system, via a human-machine interface of the vehicle system, that the trailer is under control.

In an aspect of the present disclosure, the method may further include: determining that the plurality of oscillation amplitudes are increasing after applying the predetermined, variable amounts of frictional force to the trailer; in response to determining that the plurality of oscillation amplitudes are increase, determining that the trailer is uncontrollable after applying the predetermined, variable amounts of frictional force to the trailer using the hitch angle data received from the hitch angle sensor; and communicating to an operator of the vehicle system, via a human-machine interface of the vehicle system, that the trailer is uncontrollable.

In an aspect of the present disclosure, the method may further include: determining that the decay rate of the plurality of oscillation amplitudes is not decreasing after applying the predetermined, variable amounts of frictional force to the trailer; in response to determining that the decay rate of the plurality of oscillation amplitudes is not less than a calibratable threshold, determining that the trailer is under minimal control; and communicating to an operator of the vehicle system, via a human-machine interface of the vehicle system, that the trailer is under minimal control.

The actuator may include a friction plate configured to apply the resistive/resisting force to the trailer. The actuator may include a force sensor is in communication with the controller. The force sensor is coupled to the friction plate to monitor and measure the friction force applied to the trailer. The force sensor is configured to generate and send a feedback signal to the controller. The feedback signal is indicative of a magnitude of the friction force applied to the trailer by the actuator.

In an aspect of the present disclosure, the method may further include receiving the feedback signal from the force sensor to ensure that the actuator applies the friction force determined using the vehicle speed irrespective of operational conditions, including environmental conditions, wears and heating on the plate.

In an aspect of the present disclosure, the method may further include commanding, by the controller, the actuator to apply the friction force to the trailer taking into account the feedback signal.

In an aspect of the present disclosure, a vehicle system includes a trailer, a vehicle coupled to the trailer, wherein the vehicle includes an actuator, a hitch angle sensor, and a controller in communication with the hitch angle sensor. The hitch angle sensor is configured to measure a hitch angle between the trailer and the vehicle. The actuator is configured to apply a friction force a steel plate that would provide an external, resisting moment to the trailer around the vehicle hitch point. The controller is programmed to: receive a vehicle speed signal of the vehicle system, wherein the vehicle speed signal is indicative of a vehicle speed of the vehicle system; determine the friction force to be applied to the trailer by the actuator using the vehicle speed of the vehicle system and a graph that establishes a relationship between the friction force to be applied to the trailer and the vehicle speed; command the actuator to apply the friction force to the trailer that was determined using the vehicle speed and the graph; receive hitch angle data from the hitch angle sensor; detect a trailer sway using the hitch angle data, wherein the trailer sway has oscillations having a plurality of oscillation amplitudes; in response to detecting the trailer sway, command the actuator to apply predetermined, variables amount of frictional force to the trailer to dampen the trailer sway; monitor a decay rate of the plurality of oscillation amplitudes after commanding the actuator to apply the predetermined, variable amounts of frictional force to the trailer; and adjust the graph that establishes the relationship between the friction force and the vehicle speed using the decay rate of the plurality of oscillation amplitudes to create an updated graph.

In an aspect of the present disclosure, the controller is further programmed to determine the friction force to be applied to the trailer by the actuator using the vehicle speed of the vehicle system and the updated graph; and command the actuator to apply the friction force that was determined using the vehicle speed and the updated graph.

The relationship between the friction force and the vehicle speed may be a linear function, and the controller is further programmed to adjust the graph by changing a slope of the linear function.

The relationship between the friction force and the vehicle speed may be a step function, and the controller is further programmed to adjust the graph by changing a scale of the step function.

In an aspect of the present disclosure, the controller is further programmed to: determine that the decay rate of the plurality of oscillation amplitudes is less than a calibratable threshold after applying a predetermined, variable amount of frictional force to the trailer; in response to determining that the decay rate of the plurality of oscillation amplitudes is less than a calibratable threshold, determine that the trailer is under control; and communicate to an operator of the vehicle, via a human-machine interface of the vehicle system, that the trailer is under control.

The controller may be further programmed to: determine that the plurality of oscillation amplitudes are increasing after applying the predetermined, variable amounts of frictional force to the trailer; in response to determining that the plurality of oscillation amplitudes are increased, determine that the trailer is uncontrollable after applying the predetermined, variable amounts of frictional force to the trailer using the hitch angle data received from the hitch angle sensor; and communicate to an operator of the vehicle, via a human-machine interface of the vehicle, that the trailer is uncontrollable.

The controller may be further programmed to: determine that the decay rate of the plurality of oscillation amplitudes is not less a calibrate threshold after applying the predetermined, variable amount of frictional force to the trailer; in response to determining that the decay rate of the plurality of oscillation amplitudes is not less than a calibratable threshold, determine that the trailer is under minimal control; and communicate to an operator of the vehicle system, via a human-machine interface of the vehicle system, that the trailer is under minimal control.

The actuator may include a friction plate configured to apply the friction force to the trailer. The actuator may include a force sensor is communication with the controller, the force sensor is coupled to the friction plate to monitor and measure the friction force applied to the trailer. The force sensor is configured to generate and send a feedback signal to the controller. The feedback signal is indicative of a magnitude of the friction force applied to the trailer by the actuator.

The controller may be further programmed to receive the feedback signal from the force sensor to ensure that the actuator applies the friction force determined using the vehicle speed irrespective of environmental conditions. The controller may be further programmed to command the actuator to apply the friction force to the trailer taking into account the feedback signal.

The above features and advantages and other features and advantages of the present teachings are readily apparent from the following detailed description of the best modes for carrying out the teachings when taken in connection with the accompanying drawings.

DETAILED DESCRIPTION

The following detailed description is merely exemplary in nature and is not intended to limit the application and uses. Furthermore, there is no intention to be bound by expressed or implied theory presented in the preceding technical field, background, brief summary, or the following detailed description. As used herein, the term "module" refers to hardware, software, firmware, electronic control component, processing logic, and/or processor device, individually or in combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

Figure 1:
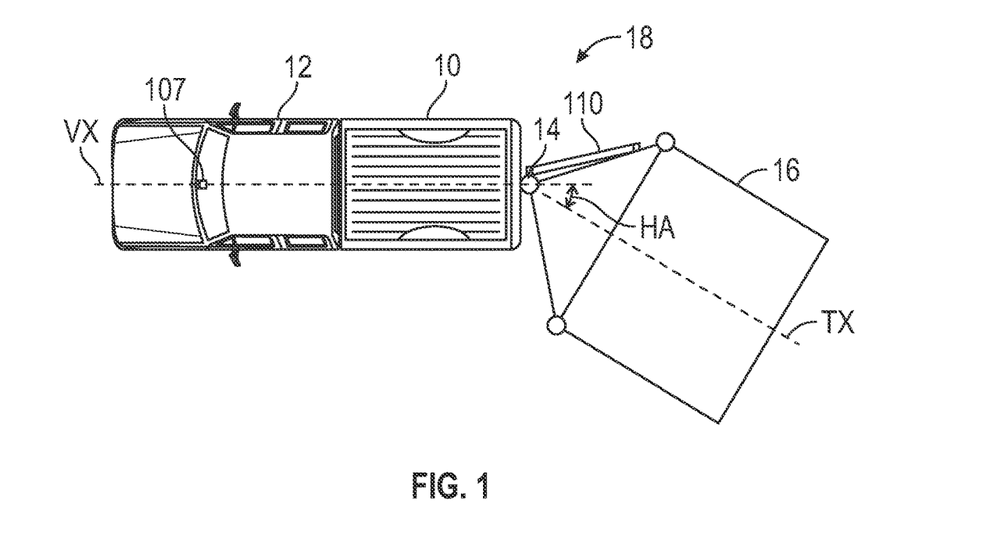
FIG. 1 is a schematic, top view of a vehicle attached to a trailer.

With reference to FIG. 1, a vehicle 10 includes a body 12 and a hitch 14 coupled to the body 12. The vehicle 10 is configured to tow a trailer 16. The vehicle 10 defines a central vehicle axis VX and a central trailer axis TX. During operation, the hitch 14 functions as a pivot point and, therefore, the trailer 14 is able to pivot about the hitch 14. The spatial relationship between the vehicle 10 and the trailer 16 may be measured with a hitch angle HA, which is an angle defined from the central vehicle axis VX to the central trailer axis TX. The vehicle 10 is depicted in the illustrated embodiment as a pickup truck, but it should be appreciated that other vehicles, including sedans, sport utility vehicles (SUVs), recreational vehicles (RVs), and the like, may also be used. Further, the vehicle 10 may be an electric vehicle, a hybrid vehicle, or an engine vehicle. The vehicle 10 and the trailer 16 are collectively referred to as a vehicle system 18. The vehicle 10 includes a human-machine interface (HMI) 107 that is configured to alert the vehicle operator of different operational conditions.

Figure 2:
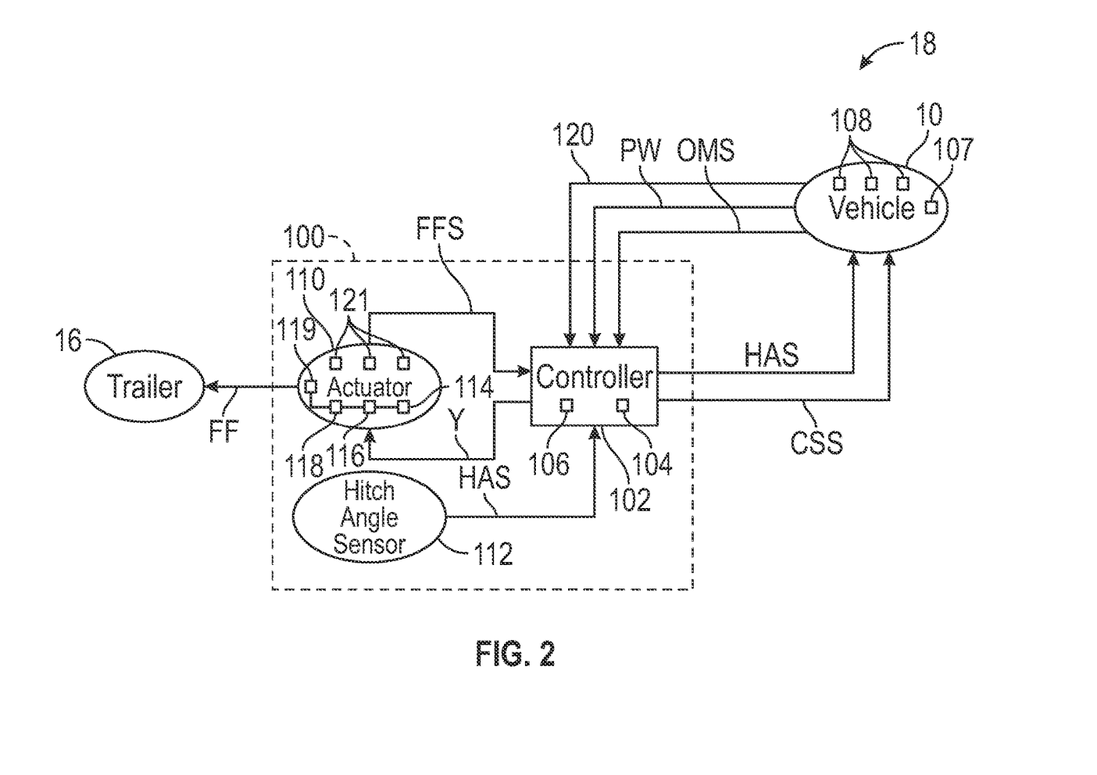
FIG. 2 is a schematic illustration of a system architecture of the vehicle, a vehicle sway friction system, and the trailer of FIG. 1.

With reference to FIG. 2, the vehicle 10 includes a vehicle sway friction system 100 capable of applying an external resisting moment to the trailer 16 to dampen trailer sway. When trailer sway occurs, the trailer 16 moves side to side being the vehicle 10. Trailer sway is also referred to as "fishtailing". The vehicle sway friction system 100 includes a controller 102.

The controller 102 includes at least one processor 104 and at least one computer-readable storage device or media 106. The processor 104 may be a custom-made, a central processing unit (CPU), a graphics processing unit (GPU), an auxiliary processor among several processors associated with the controller 102, a semiconductor-based microprocessor (in the form of a microchip or chip set), a combination thereof, or generally a device for executing instructions. The computer readable storage device or media 106 may include volatile and nonvolatile storage in read-only memory (ROM), random-access memory (RAM), and keep-alive memory (KAM), for example. KAM is a persistent or non-volatile memory that may be used to store various operating variables while the processor 104 is powered down. The computer-readable storage device or media 106 may be implemented using a number of known memory devices such as PROMs (programmable read-only memory), EPROMs (electrically PROM), EEPROMs (electrically erasable PROM), flash memory, or other electric, magnetic, optical, or combination memory devices capable of storing data, some of which represent executable instructions, used by the controller 102 in controlling the vehicle sway friction system 100.

The instructions may include one or more separate programs, each of which comprises an ordered listing of executable instructions for implementing logical functions. The instructions, when executed by the processor 104, receive and process signals from the vehicle sensors 108, on-board device sensors, perform logic, calculations, methods and/or algorithms for automatically controlling the components of the vehicle 10, and generate control signals that are transmitted to an actuator 110 to automatically control the components of the vehicle sway friction system 100 based on the logic, calculations, methods, and/or algorithms. Although only one controller 102 is shown in FIG. 2, embodiments of the vehicle sway friction system 100 may include a number of controllers 102 that communicate over suitable communication medium or a combination of communication mediums and that cooperate to process the sensor signals, perform logic, calculations, methods, and/or algorithms, and generate control signals to automatically control features of the vehicle sway friction system 100.

With continued reference to FIG. 2, the vehicle sway friction system 100 further includes the actuator 110, which may be referred to as the sway control device. The actuator 110 may be a sway control bar or a device suitable to apply a force FF to the trailer 16 to dampen trailer sway. The actuator 110 may be directly connected to the trailer 16 to facilitate the application of the friction force FF to the trailer 16 (see also FIG. 1). Further, the actuator 110 is in communication with the controller 102 and is therefore configured to receive commands from the controller 102. The actuator 110 is also configured to send a friction force signal FFS to the controller 102. The friction force signal FFS is indicative of the friction force FF applied to the trailer 16 by the actuator 110. The controller 102 also supplies voltage V to the actuator 110 to actuate the actuator 110.

The actuator 110 may include, for example, an electric motor 114 configured to receive the voltage V from the controller 102, a torque transmission system 116 coupled to the electric motor 114, and a friction plate 118 coupled to the torque transmission system 116. The torque transmission system 116 may be a geartrain and is configured to transmit torque from the electric motor 114 to the friction plate 118. Upon receipt of the torque from the torque transmission system 116, the friction plate 118 is configured to apply the friction force FF to the trailer 16 to dampen the trailer sway. The actuator 110 may include one or more actuator sensors 121. For example, the actuator sensors 121 may include a current sensor, a force sensor, and/or linear encoder, to determine the correct friction force applied to the friction plate 118. The actuator sensors 121 may include a pressure sensor to correlate the pressure measurements with the force applied by the actuator 110. The actuator 110 may be an electronic park brake (EPB).

The vehicle sway friction system 100 further includes a hitch angle sensor 112 configured to measure and monitor the hitch angle HA (FIG. 1). The controller 102 is in communication with the hitch angle sensor 112 and is therefore programmed to receive a hitch angle signal HAS. The hitch angle sensor 112 is configured to generate and send the hitch angle signal HAS to the controller 102. The hitch angle signal HAS is indicative of the hitch angle HA. The controller 102 is configured to send the hitch angle signal HAS. The hitch sensor 112 may be various types of sensors. For example, the hitch angle sensor 112 may be a camera, an ultrasonic sensor, a time of flight sensor or other type of displacement sensor capable of measuring the translation of a movable plate 119 of the actuator 110 relative to the friction plate 118 of the actuator 110. With the A frame angle measurement, the controller 102 is capable of correlating the amount of translation of the hitch angle and/or the hitch angle rate measurement. It is envisioned that the actuator 110 may be an electronic parking brake or another device suitable to apply a force to the trailer 16. For example, a plate 119 may apply a friction force to the trailer 16, thereby resulting a resisting force/moment on the trailer 16.

The controller 102 is configured to send a controllability status signal CSS to the vehicle 10. The controllability status signal CSS is indicative of whether the trailer 16 is under control. The vehicle 10 is also configured to supply power PW to the controller 102 and an operating mode signal OMS to the controller 102. The operating mode signal OMS is indicative of the operating mode of the vehicle 10. The vehicle 10 includes a plurality of vehicle sensors 108 each capable of sending sensor signals to the controller 102 through a controller area network (CAN) bus 120. The CAN bus 120 may communicate signals between the vehicle 10 to the controller 102, such as signals indicative of vehicle speed, the direction of the vehicle, wind gust detection, passing vehicle detection, steering wheel angle, lane change detection, uphill/downhill detection/angle, tire-road friction coefficient, the impending forward force detection, banking angle, PRNDL state, wheels speeds, gross combined weight rating (GCWR) estimate, among others. Alternatively, the vehicle sway friction system 100 may be a stand alone device that does not communicate with the vehicle 10. The output of the vehicle sensors 108 may be fused to determine an unintended trailer sway on a vehicle level. The GCWR estimate may be used to automatically recalibrate if the overall weight configuration of the vehicle 10 and the trailer 16 is above a predetermined amount. When trailer instability is identified, the current speed of the vehicle 10 may be noted and saved as a speed of interest during recalibration.

The vehicle sensors 108 include, but are not limited to, a vehicle speed sensor capable of measuring the speed of the vehicle 10 and/or the vehicle system 18. The vehicle speed of the vehicle 10 and/or the vehicle system 18 may also be obtained from a Global Positioning System (GPS) and/or an inertial measurement unit (IMU). The vehicle speed may be used to correlate with the friction force FF output by the actuator 110. The actuator sensors 121 may also include a direction sensor, such as an IMU. The direction sensor determines the direction of the vehicle 10 (i.e., the vehicle direction). The vehicle direction may be used to determine if the vehicle 10 is moving forward or backwards. The actuator sensors 121 may also be configured to measure and detect wind gust, passing vehicles, steering wheel angle, lane changes, uphill or downhill movements, tire-road friction coefficient, brake pedal position or pressure, impending forward force, banking angles, and the state of the vehicle transmission (i.e., the PRNDL state). The vehicle sensors 108 may include rear camera to measure the angle of the A frame of the trailer 16 and the trailer length. The actuator sensors 121 may also include onboard ultrasonic sensors, wheel sensors, and/or IMUs to detect trailer sway. The vehicle 10 may also include a human-machine interface 107, such as a display and/or speakers, configured to visually and/or audibly communicate a message to the vehicle operator.

Figure 3:
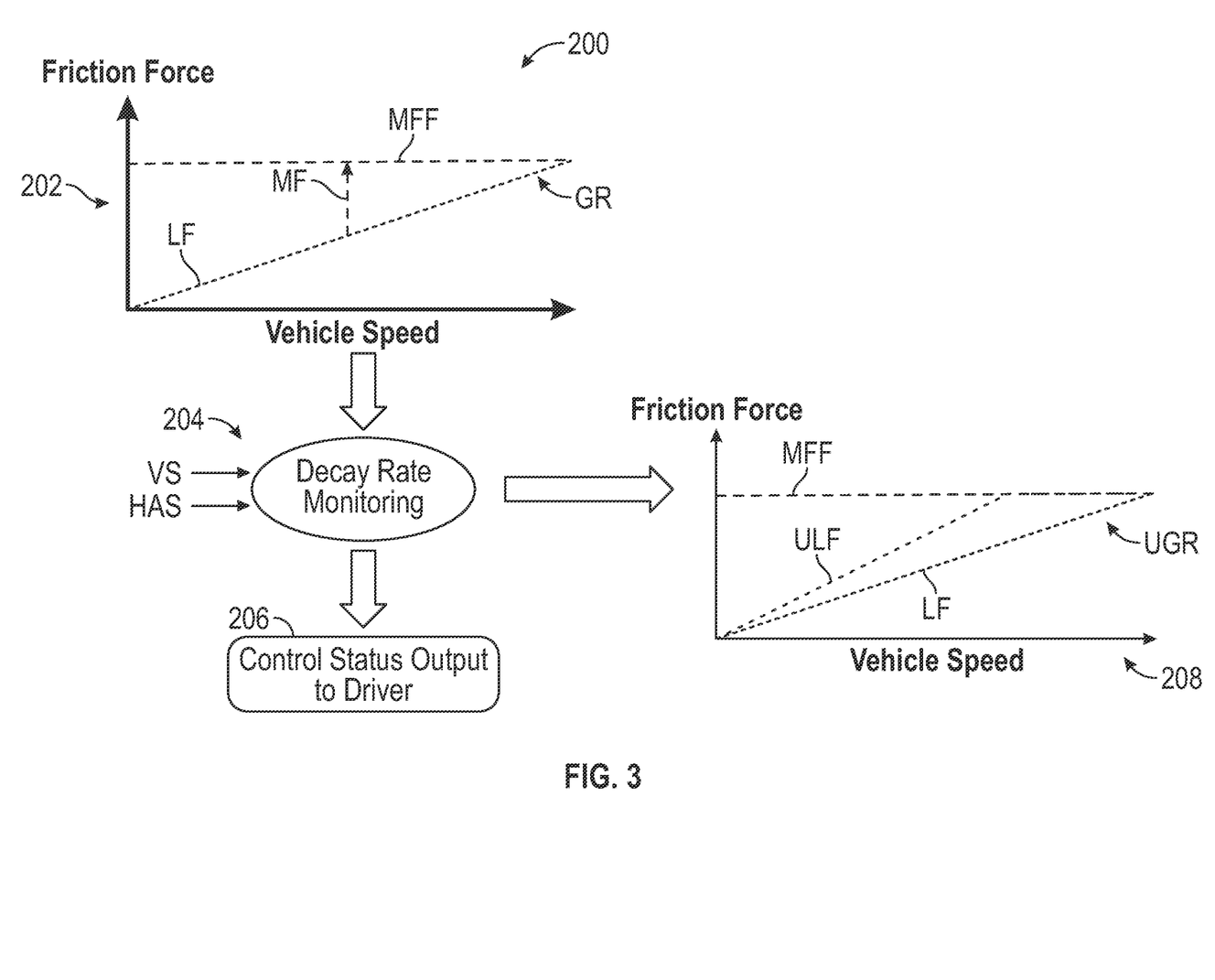
FIG. 3 is a flowchart of a method for recalibrating the friction applied to the trailer to dampen trailer sway shown in FIG. 1.

FIG. 3 is a flowchart of a method 200 for recalibrating the friction force FF applied to the trailer 16 to dampen trailer sway. The controller 102 is programmed to execute the instructions of the method 200. The method 200 starts at block 202. At block 202, the controller 102 controls the friction force FF applied to the trailer 16 using a graph GR that establishes a relationship between the friction force FF to be applied to the trailer 16 and the vehicle speed of the vehicle 10 and/or the vehicle system 18. The graph GR has a horizontal axis that represents vehicle speed and a vertical axis that represents friction force FF. Therefore, friction force FF to be applied to the trailer 16 by the actuator 110 is a function of the vehicle speed. Thus, at block 202, the controller 102 may receive the vehicle speed signal VS from the vehicle 10. As discussed above, the vehicle speed signal VS is representative of the vehicle speed of the vehicle 10 and/or the vehicle system 18. The graph GR also illustrates a calibratable, maximum frictional force MFF that the actuator 110 is able to apply to the trailer 16. The graph GR may be generated by testing the vehicle system 10 to determine the friction force FF that has to be applied to the trailer 16 to maintain trailer stability as a function of the vehicle speed.

At block 202, the controller 102 determines the friction force FF that has to be applied to the trailer 16 as a function of the vehicle speed using the graph GR when no trail sway is detected. The controller 102 then commands the actuator 110 to apply the friction force FF determined as a function of the vehicle speed to maintain trailer stability. When trailer sway is detected, however, the controller 102 commands the actuator 110 to apply predetermined, variable amounts of frictional force to the trailer 16 to dampen trailer sway as illustrated by arrow MF. The controller 102 may detect whether tray sway is occurring using the hitch angle data received from the hitch angle sensor 112. The controller 102 therefore receives hitch angle signal HAS, which contains the hitch angle data, from the hitch angle sensor 112 and, using the hitch angle data, detects whether a trailer sway is occurring. As mentioned above, trailer sway occurs when the side forces on the trailer 16 cause the trailer 16 to move side to side behind the vehicle 10. Therefore, the trailer sway is characterized by oscillations each of which has an oscillation amplitude. In response to detecting the trailer sway, the controller 102 commands the actuator 110 to apply predetermined, variable amounts of frictional force to the trailer 16 to dampen trailer sway as illustrated by arrow MF. The method 200 then proceeds to block 204.

At block 204, the controller 102 continues to receive the vehicle speed signal VS and the hitch angle signal HAS. Using the hitch angle signal HAS, the controller 102 monitors the decay rate of the oscillation amplitudes after commanding the actuator 110 to apply predetermined, variable amounts of frictional force to the trailer 16. The method 200 then proceeds to block 206 and block 208.

Figure 4:
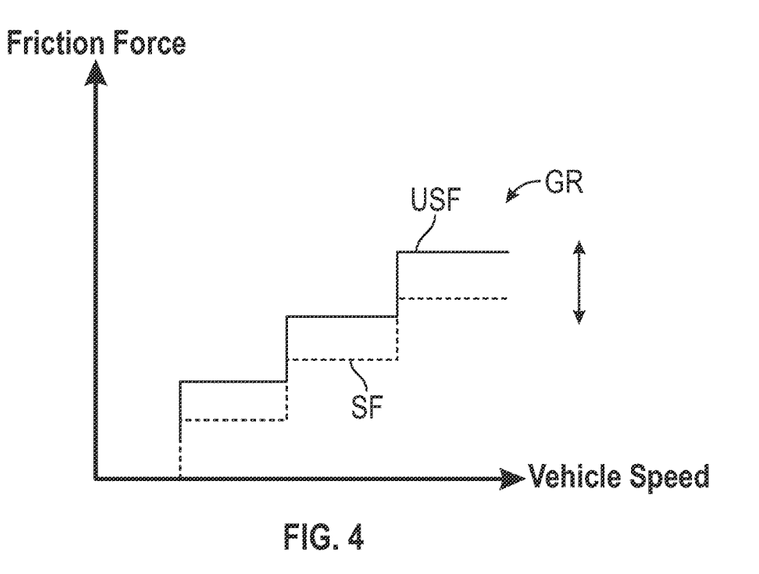
FIG. 4 is a graph of a friction force versus vehicle speed, wherein the relationship between the friction force and the vehicle speed is a step function.

At block 206, the controller 102 commands the human-machine interface 107 to communicate a controllability status about the trailer sway to the vehicle operator. At block 208, the controller 102 adjusts the graph GR that establishes the relationship between the friction force FF and the vehicle speed using the decay rate of the plurality of oscillation amplitudes to create an updated graph UGR. In the graph GR, the relationship between the friction force FF and the vehicle speed may be at least partly defined by a linear function LF as shown in FIG. 3, and the controller 102 adjusts the graph GR by changing the slope of the linear function LF to create an updated linear function ULF. Alternatively, as shown in FIG. 4, the relationship between the friction force FF and the vehicle speed may be defined by a step function SF, and the controller 102 adjusts the graph GR by changing the scale of the step function SF to create an updated step function USF. At block 208, the controller 102 then determines the friction force FF to be applied to the trailer 16 by the actuator 110 using the vehicle speed of the vehicle system 18 and the updated graph UGR. Next, the controller 102 commands actuator 110 to apply the friction force FF that was determined using the vehicle speed and the updated graph UGR to maximize stability of the trailer 16 and minimize the risk of trailer sway.

Figure 5:
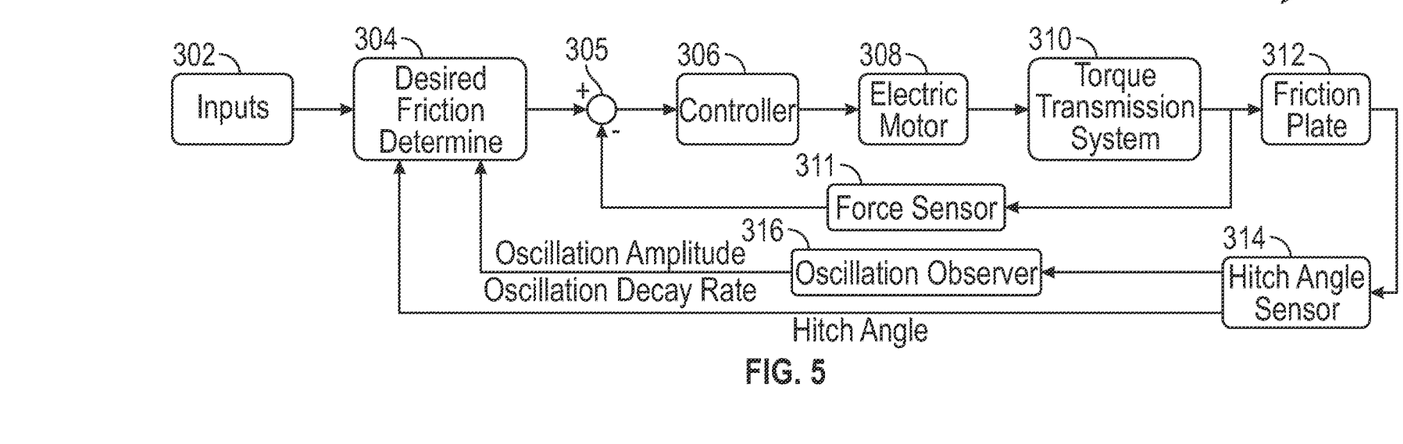
FIG. 5 is a flowchart of a method for controlling the friction force applied to dampen the trailer sway.

FIG. 5 is a flowchart of a method 300 for controlling the friction force FF applied to the trailer 16 to maintain trailer stability. The method 300 begins at block 302. At block 302, inputs are gathered using, for example, the vehicle sensors 108 and the hitch angle sensor 112. The inputs include, but are not limited, to vehicle speed, vehicle direction, steering wheel angle, wind gust detection, passing vehicle detection, lane change detection, uphill/downhill detection and angle, tire-road friction coefficient, brake pedal position and/or pressure, impending forward force detection, banking angle, and/or transmission state (i.e., the PRNDL state). These inputs are used for multiple purposes, namely: to apply more friction force FF to the trailer 16 to ensure trailer stability; to allow an intended driving maneuver; to allow stable lane transition, to allow stable travel on varying road grades, to allow vehicle 10 and trailer 16 to decelerate in a stable manner, to negotiate the banking angle in a stable manner, and to indicate in which direction the vehicle 10 and the trailer 16 are moving. At block 302, the inputs are sent to the controller 102. Therefore, the controller 102 receives the inputs. The method 300 then continues to block 304.

At block 304, the controller 102 determine the friction force FF to be applied to the trailer 16 as a function of the vehicle speed and the other inputs. As discussed above with respect to FIG. 3, the controller 102 may use the graph GR or the updated graph UGR to determine the frictional force FF applied to the plate 119. Once the friction force FF has been determined, the method 300 proceeds to block 306.

At block 306, the controller 102 commands the actuator 110 to apply the friction force FF to the trailer 16 as determined in block 304. To do so, the method 300 continues to block 308. At block 308, the controller 102 commands the electric motor 114 to operate at the power in order to produce to the friction force FF determined at block 304. Then, the method 300 proceeds to block 310. At block 310, the torque output of the electric motor 114 is transmitted to the torque transmission system 116. At block 310, the torque transmission system 116 may convert the torque into a linear translation force to be applied to the friction plate 118. At block 312, the friction plate 118 applies the friction force FF to the trailer 16 to maintain trailer stability. At block 311, the force sensor, which is one of the actuator sensors 121, measures and monitors the force exerted on the friction plate 118. The force sensor generates and sends a feedback signal to the controller at block 305. This feedback signal is indicative of a magnitude of the friction force FF applied to the trailer 16 by the actuator 110. At block 305, the controller 102 receives the feedback signal from the force sensor and fuses this signal with the friction force determined at block 304 to ensure that the actuator 110 applies the friction force FF determined using the vehicle speed irrespective of environmental conditions. After block 312, the method 300 proceed to block 314.

At block 314, the hitch angle sensor 112 measures and monitors the hitch angle HA and determines the hitch angle rate. The hitch angle rate may then be used to determine the friction force FF at block 304. As discussed above, the hitch angle sensor 112 may be a camera, an ultrasonic sensor, a time of flight sensor or other type of displacement sensor capable of measuring the translation of a movable plate 119 of the actuator 110 relative to the friction plate 118 of the actuator 110. With the A frame angle measurement, the controller 102 is capable of correlating the amount of translation of the hitch angle and/or the hitch angle rate measurement. Regardless of the type of hitch angle sensor 112 used, the hitch angle sensor 112 generates hitch angle data, which includes the hitch angle, the hitch angle rate over time, among others. The method 300 then proceeds to block 316.

At block 316, the controller 102 observes the oscillations using the hitch angle data obtained from the hitch angle sensor 112. Specifically, the controller 102 determines the oscillation amplitudes and the oscillation decay rate during trailer sway using the hitch angle data obtained from the hitch angle sensor 112. The controller 102 then uses the oscillation amplitudes and the oscillation decay rate to determine the friction force FF to be applied to the trailer 16 at block 304.

Figure 6:
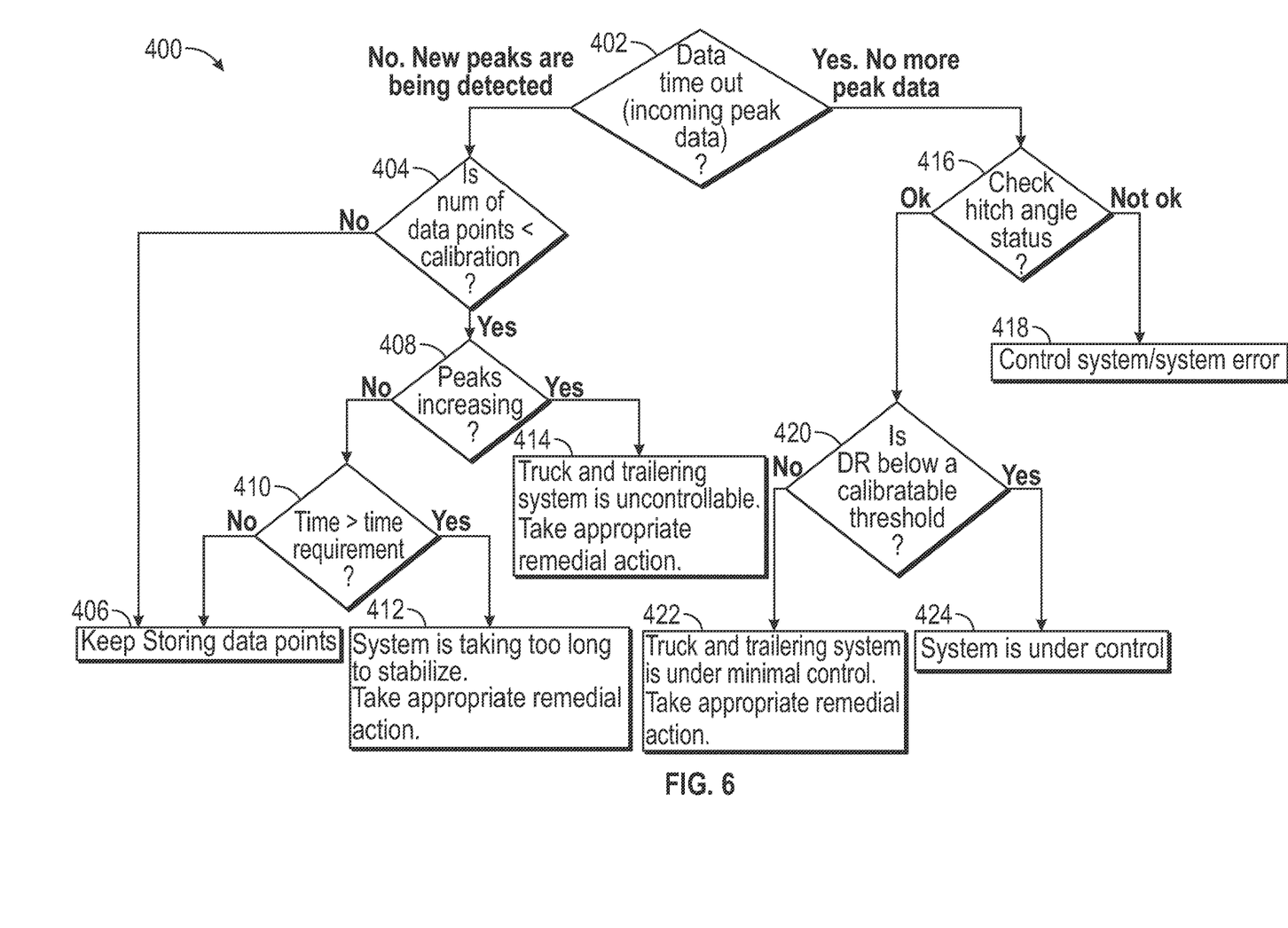
FIG. 6 is a flowchart of a method for monitoring decay rate.

FIG. 6 is a flowchart of a decay rate monitoring method 400. The method 400 begins at block 402. At block 402, the controller 102 requests the hitch angle data from the hitch angle sensor 112. The hitch angle data includes oscillations amplitudes and oscillation decay rate when a trailer sway is detected. Once the controller 102 requests the hitch angle data, the controller 102 starts a clock and eventually determines whether a predetermined amount of time has lapsed since the controller 102 requested the hitch angle data. If the predetermined amount of time has not lapsed since the controller 102 requested the hitch angle data, then the method 400 continues to block 404.

At block 404, the controller 102 determines whether the number of data points of the hitch angle data is greater than a calibratable threshold. If the controller 102 determines that the number of data points of the hitch angle data is not greater than the calibratable threshold, the method 400 proceeds to block 406.

At block 406, the controller 102 continues to monitor the hitch angle signal and store peaks in trailer sway oscillations. When trailer sway has been detected, the actuator 110 is to apply predetermined, variable amounts of friction force to the trailer 16 to dampen trailer sway. The stability of the trailer is also reevaluated.

At block 404, if the controller 102 determines that the number of data points of the hitch angle data is greater than a calibratable threshold, then the method 400 continues to block 408. At block 408, the controller 102 determines whether the oscillation amplitudes of the hitch angle data are increasing after applying the predetermined, variable amounts of frictional force to the trailer 16. If the oscillation amplitudes of the hitch angle data are not increasing, then the method 400 continues to block 410.

At block 410, the controller 102 determines whether the time elapsed since the controller 102 requested the hitch angle data is greater than or equal to a calibratable timing threshold. If the time elapsed since the controller 102 requested the hitch angle data is less than the calibratable timing threshold, then the method 400 continues to block 406. If the time elapsed since the controller 102 requested the hitch angle data is greater than or equal to the calibratable timing threshold, then the method 400 continues to block 412. At block 412, the controller 102 commands the human-machine interface 107 to communicate to the vehicle operator that the vehicle sway friction system 100 is taking too long to stabilize. The controller 102 may also command the human-machine interface 107 to communicate to the vehicle operator that the trailer 16 is under minimal control, that the decay rate is linear, and that the trailer sway is taking too long to dampen.

At block 408, if the oscillation amplitudes of the hitch angle data are increasing, then the method 400 continues to block 414. At block 414, the controller 102 commands the human-machine interface 107 to communicate to the vehicle operator that the trailer 16 is uncontrollable.

At block 402, if the predetermined amount of time has lapsed since the controller 102 requested the hitch angle data, then the method 400 continues to block 416. At block 416, the controller 102 checks the vehicle sway friction system 100 to determine whether the hitch angle status is okay. If the hitch angle status is not okay, the method 400 continues to block 418. At block 418, the controller 102 commands the human-machine interface 107 to communicate a system error to the vehicle operator. Control status −2 means that there is a system error. The system error may be that the time out has occurred in the data collection, that the vehicle sway friction system 100 is damaged and/or that hitch angle data is not straight.

At block 416, if the hitch angle status is okay, then the method 400 continues to block 420. At block 420, the controller 102 determines whether the decay rate of the oscillations during the trailer sway is less than a calibratable threshold. If the decay rate of the oscillations during the trailer sway is not less than the calibratable threshold, the method 400 continues to block 422. At block 422, the controller 102 commands the human-machine interface 107 to communicate to the vehicle operator that the trailer 16 is under minimal control.

At block 420, if the decay rate of the oscillations during the trailer sway is less than the calibratable threshold, then the method 400 continues to block 424. At block 424, the controller 102 commands the human-machine interface 107 to communicate to the vehicle operator that the trailer 16 is under control. Control status 3 means that the trailer 16 is under complete control, and the damping of the trailer sway has been successful.

While the best modes for carrying out the teachings have been described in detail, those familiar with the art to which this disclosure relates will recognize various alternative designs and embodiments for practicing the teachings within the scope of the appended claims. The vehicle system 18 illustratively disclosed herein may be suitably practiced in the absence of any element which is not specifically disclosed herein. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. The phrase "at least one of" as used herein should be construed to include the non-exclusive logical "or", i.e., A and/or B and so on depending on the number of components.

What is claimed is:

1. A method for dampening trailer sway, comprising:
   receiving, by a controller of a vehicle system that is coupled to a trailer, a vehicle speed signal of the vehicle system, wherein the vehicle speed signal is indicative of a vehicle speed of the vehicle system;
   determining a friction force to be applied to the trailer by an actuator using the vehicle speed of the vehicle system and a graph that establishes a relationship between the friction force to be applied to the trailer and the vehicle speed;
   commanding, by the controller, the actuator to apply the friction force to the trailer that was determined using the vehicle speed and the graph;
   receiving, by the controller, hitch angle data from a hitch angle sensor that is in communication with the controller, wherein the hitch angle sensor is configured to measure and monitor a hitch angle of the trailer that is connected to the vehicle system;
   detecting, by the controller, the trailer sway using the hitch angle data, wherein the trailer sway has oscillations having a plurality of oscillation amplitudes;
   in response to detecting the trailer sway, commanding, by the controller, the actuator to apply predetermined, variable amounts of frictional force to the trailer to dampen the trailer sway;
   monitoring a decay rate of the plurality of oscillation amplitudes after commanding the actuator to apply the predetermined, variable amounts of frictional force to the trailer; and
   adjusting, by the controller, the graph that establishes the relationship between the friction force and the vehicle speed using the decay rate of the plurality of oscillation amplitudes to create an updated graph.

2. The method of claim 1, further comprising:
   determining the friction force to be applied to the trailer by the actuator using the vehicle speed of the vehicle system and the updated graph; and
   commanding, by the controller, the actuator to apply the friction force that was determined using the vehicle speed and the updated graph.

3. The method of claim 1, wherein the relationship between the friction force and the vehicle speed is a linear function, and adjusting, by the controller, the graph includes changing a slope of the linear function.

4. The method of claim 1, wherein the relationship between the friction force and the vehicle speed is a step function, and adjusting, by the controller, the graph includes changing a scale of the step function.

5. The method of claim 1, further comprising:
   determining that the decay rate of the plurality of oscillation amplitudes is linear after applying the predetermined, variable amounts of frictional force to the trailer;
   in response to determining that the decay rate of the plurality of oscillation amplitudes is linear, determining that the trailer is under control; and
   communicating to an operator of the vehicle system, via a human-machine interface of the vehicle system, that the trailer is under control.

6. The method of claim 1, further comprising:
   determining that the plurality of oscillation amplitudes are increasing after applying the predetermined, variable amounts of frictional force to the trailer;
   in response to determining that the plurality of oscillation amplitudes are increased, determining that the trailer is uncontrollable after applying the predetermined, variable amounts of frictional force to the trailer using the hitch angle data received from the hitch angle sensor; and
   communicating to an operator of the vehicle system, via a human-machine interface of the vehicle system, that the trailer is uncontrollable.

7. The method of claim 1, further comprising:
determining that the decay rate of the plurality of oscillation amplitudes is not linear after applying the predetermined, variables amounts of frictional force to the trailer;
in response to determining that the decay rate of the plurality of oscillation amplitudes is not less than a calibratable threshold, determining that the trailer is under minimal control; and
communicating to an operator of the vehicle system, via a human-machine interface of the vehicle system, that the trailer is under minimal control.

8. The method of claim 1, wherein the actuator includes a friction plate configured to apply an external resisting moment to the trailer, the actuator includes a force sensor is communication with the controller, the force sensor is coupled to the friction plate to monitor and measure the friction force applied to a plate, and the force sensor is configured to generate and send a feedback signal to the controller, and the feedback signal is indicative of a magnitude of the friction force applied to the trailer by the actuator.

9. The method of claim 8, further comprising receiving the feedback signal from the force sensor to ensure that the actuator applies the friction force determined using the vehicle speed irrespective of environmental conditions.

10. The method of claim 9, further comprising commanding, by the controller, the actuator to apply the friction force to the trailer taking into account the feedback signal.

11. A vehicle system, comprising:
a trailer;
a vehicle coupled to the trailer, wherein the vehicle includes an actuator, a hitch angle sensor, and a controller in communication with the hitch angle sensor, the hitch angle sensor is configured to measure a hitch angle between the trailer and the vehicle, the actuator is configured to apply a friction force to the trailer, and the controller is programmed to:
receive a vehicle speed signal of the vehicle system, wherein the vehicle speed signal is indicative of a vehicle speed of the vehicle system;
determine the friction force to be applied to the trailer by the actuator using the vehicle speed of the vehicle system and a graph that establishes a relationship between the friction force to be applied to the trailer and the vehicle speed;
command the actuator to apply the friction force to the trailer that was determined using the vehicle speed and the graph;
receive hitch angle data from the hitch angle sensor;
detect a trailer sway using the hitch angle data, wherein the trailer sway has oscillations having a plurality of oscillation amplitudes;
in response to detecting the trailer sway, command the actuator to apply predetermined, variable amounts of frictional force to the trailer to dampen the trailer sway;
monitor a decay rate of the plurality of oscillation amplitudes after commanding the actuator to apply the predetermined, variable amounts of frictional force to the trailer; and
adjust the graph that establishes the relationship between the friction force and the vehicle speed using the decay rate of the plurality of oscillation amplitudes to create an updated graph.

12. The vehicle system of claim 11, wherein the controller is further programmed to:
determine the friction force to be applied to the trailer by the actuator using the vehicle speed of the vehicle system and the updated graph;
command the actuator to apply the friction force that was determined using the vehicle speed and the updated graph.

13. The vehicle system of claim 11, wherein the relationship between the friction force and the vehicle speed is a linear function, and the controller is further programmed to adjust the graph by changing a slope of the linear function.

14. The vehicle system of claim 11, wherein the relationship between the friction force and the vehicle speed is a step function, and the controller is further programmed to adjust the graph by changing a scale of the step function.

15. The vehicle system of claim 11, wherein the controller is further programmed to:
determine that the decay rate of the plurality of oscillation amplitudes is linear after applying the predetermined, variable amounts of frictional force to the trailer;
in response to determining that the decay rate of the plurality of oscillation amplitudes is linear, determine that the trailer is under control; and
communicate to an operator of the vehicle, via a human-machine interface of the vehicle system, that the trailer is under control.

16. The vehicle system of claim 11, wherein the controller is further programmed to:
determine that the plurality of oscillation amplitudes are increasing after applying the predetermined, variable amounts of frictional force to the trailer;
in response to determining that the plurality of oscillation amplitudes are increasing, determine that the trailer is uncontrollable after applying the predetermined, variable amounts of frictional force to the trailer using the hitch angle data received from the hitch angle sensor; and
communicate to an operator of the vehicle, via a human-machine interface of the vehicle, that the trailer is uncontrollable.

17. The vehicle system of claim 11, wherein the controller is further programmed to:
determine that the decay rate of the plurality of oscillation amplitudes is not less than a calibratable threshold, after applying the predetermined amounts of frictional force to the trailer;
in response to determining that the decay rate of the plurality of oscillation amplitudes is not less than the calibratable threshold, determine that the trailer is under minimal control; and
communicate to an operator of the vehicle system, via a human-machine interface of the vehicle system, that the trailer is under minimal control.

18. The vehicle system of claim 11, wherein the actuator includes a friction plate configured to apply the an external resistive moment to the trailer, the actuator includes a force sensor is communication with the controller, the force sensor is coupled to the friction plate to monitor and measure the friction force applied to the trailer, and the force sensor is configured to generate and send a feedback signal to the controller, and the feedback signal is indicative of a magnitude of the friction force applied to the trailer by the actuator.

19. The vehicle system of claim 18, wherein the controller is further programmed to receive the feedback signal from the force sensor to ensure that the actuator applies the friction force determined using the vehicle speed irrespective of environmental conditions.

20. The vehicle system of claim 19, wherein the controller is further programmed to command the actuator to apply the friction force to the trailer taking into account the feedback signal.

* * * * *